(No Model.) 6 Sheets—Sheet 2.

W. E. PENN.
MILK MEASURING AND DISCHARGING MACHINE.

No. 604,261. Patented May 17, 1898.

Witnesses.

Inventor.
William E. Penn
By Benedict and Morsell
Attorneys.

(No Model.) 6 Sheets—Sheet 3.

W. E. PENN.
MILK MEASURING AND DISCHARGING MACHINE.

No. 604,261. Patented May 17, 1898.

Witnesses.
O. N. Keeney
Anna V. Faust.

Inventor.
William E. Penn.
By Benedict and Morsell
Attorneys.

(No Model.) 6 Sheets—Sheet 4.

W. E. PENN.
MILK MEASURING AND DISCHARGING MACHINE.

No. 604,261. Patented May 17, 1898.

Witnesses.
O. H. Keeney.
Anna V. Faust.

Inventor.
William E. Penn.
By Benedict and Morsell
Attorneys.

(No Model.) 6 Sheets—Sheet 5.

W. E. PENN.
MILK MEASURING AND DISCHARGING MACHINE.

No. 604,261. Patented May 17, 1898.

Witnesses.
Inventor.
William E. Penn.
By Benedict & Morsell
Attorneys.

(No Model.) 6 Sheets—Sheet 6.
W. E. PENN.
MILK MEASURING AND DISCHARGING MACHINE.
No. 604,261. Patented May 17, 1898.
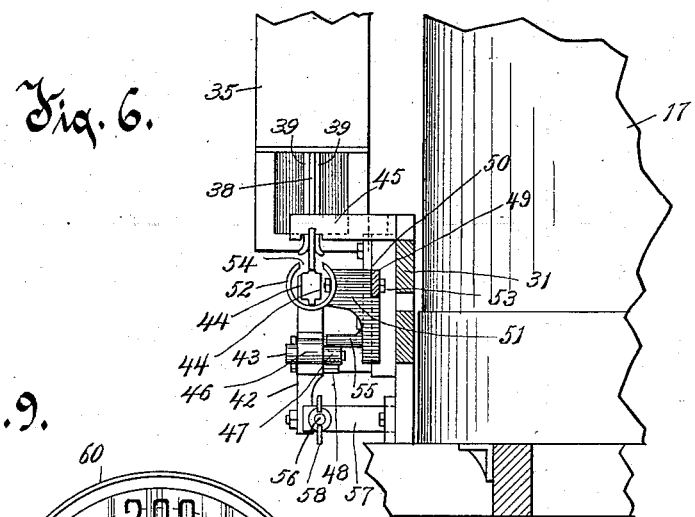
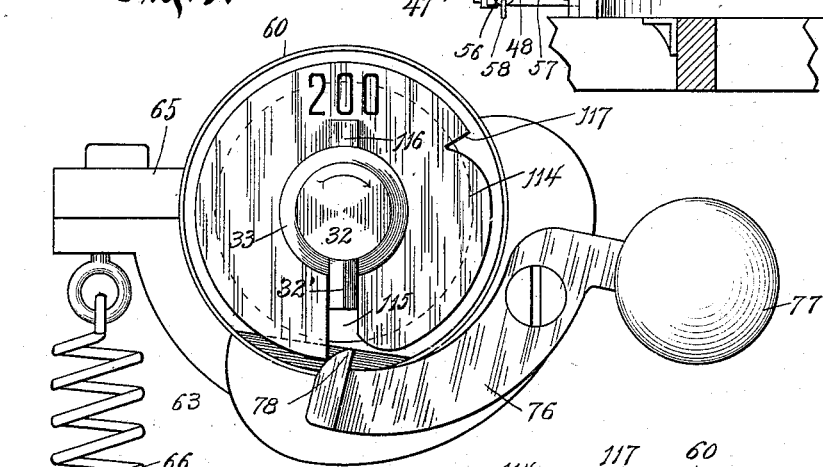
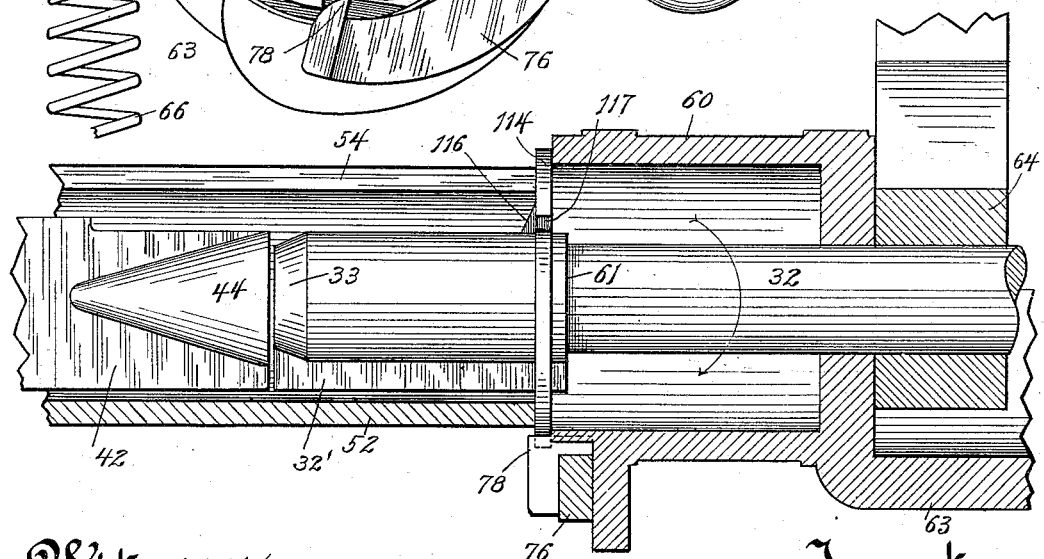
Witnesses.
C. N. Keeney
Anna V. Faust.
Inventor.
William E. Penn
By Benedict and Morsell
Attorneys.

UNITED STATES PATENT OFFICE.

WILLIAM E. PENN, OF LAKE MILLS, WISCONSIN, ASSIGNOR TO THE F. B. FARGO & COMPANY, OF SAME PLACE.

MILK MEASURING AND DISCHARGING MACHINE.

SPECIFICATION forming part of Letters Patent No. 604,261, dated May 17, 1898.

Application filed June 5, 1897. Serial No. 639,599. (No model.)

*To all whom it may concern:*

Be it known that I, WILLIAM E. PENN, of Lake Mills, in the county of Jefferson and State of Wisconsin, have invented a new and useful Improvement in Milk Measuring and Discharging Machines, of which the following is a description, reference being had to the accompanying drawings, which are a part of this specification.

My invention has relation to improvements in milk measuring and discharging machines.

The invention relates to that class of devices which are intended for use in creameries for the purpose of delivering to a patron bringing fresh milk to the creamery a certain quantity of skimmed milk after the butter-fats have been extracted from the fresh milk, which quantity is usually a predetermined percentage of the fresh milk.

The primary object is to provide an improved construction and combination of parts for effecting the measuring of the proper proportion of skimmed milk to be delivered to any particular person and discharging such measured quantity automatically, so that a patron having a proper check can withdraw and secure his due proportion of skimmed milk.

With the above primary object and other incidental objects in view the invention consists of the machine and its various parts and combination of parts or their equivalents, as hereinafter more fully set forth.

Figure 1:
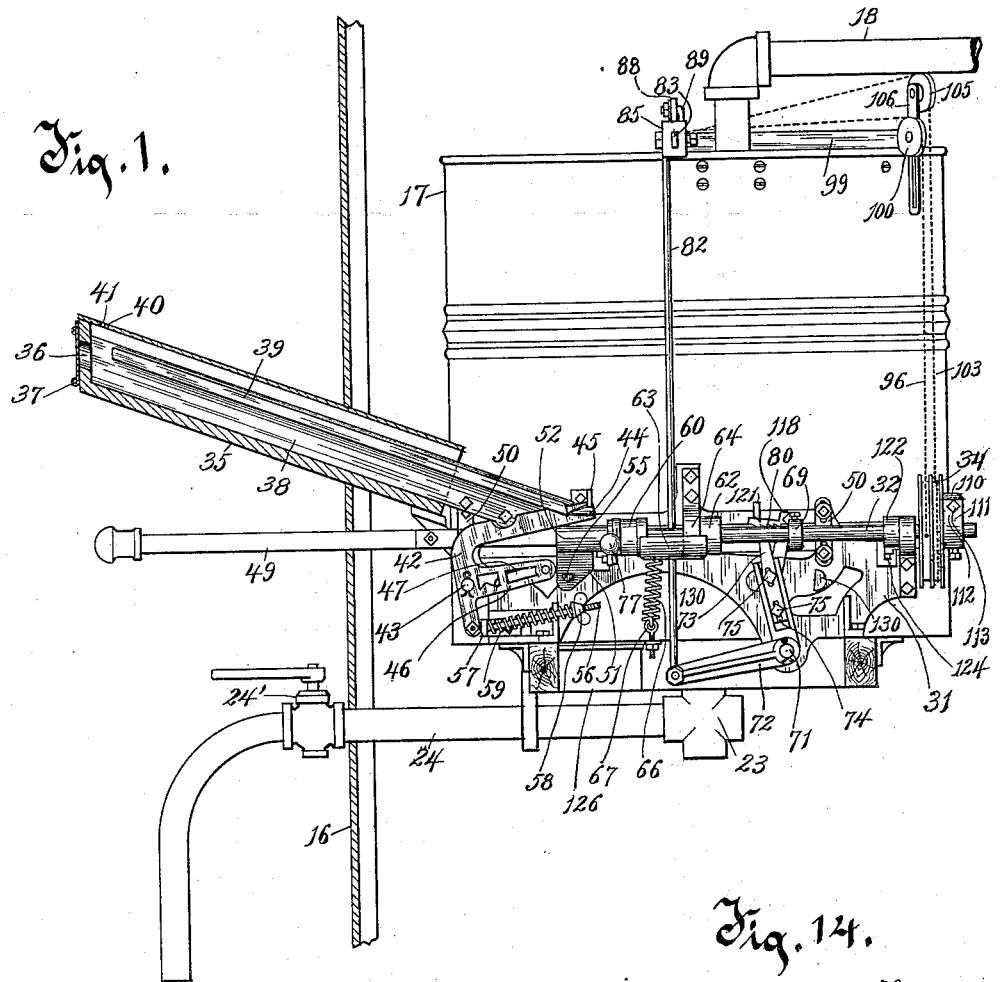
Figure 2:
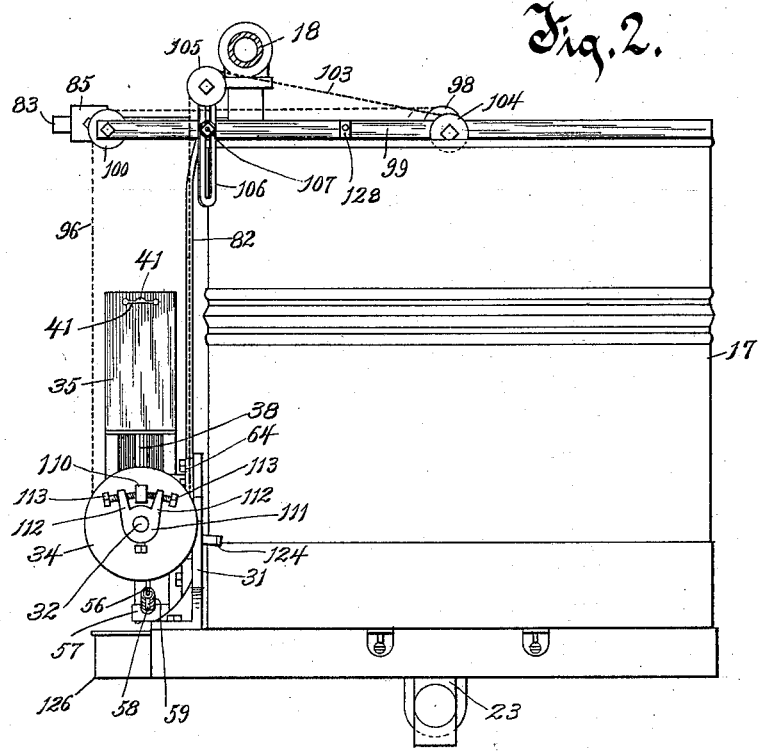
Figure 7:
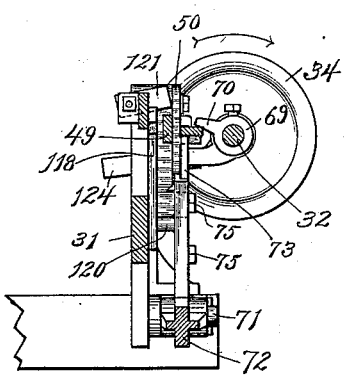
Figure 8:
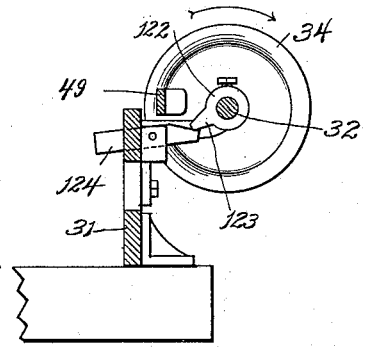
Figures 3, 11, 12:
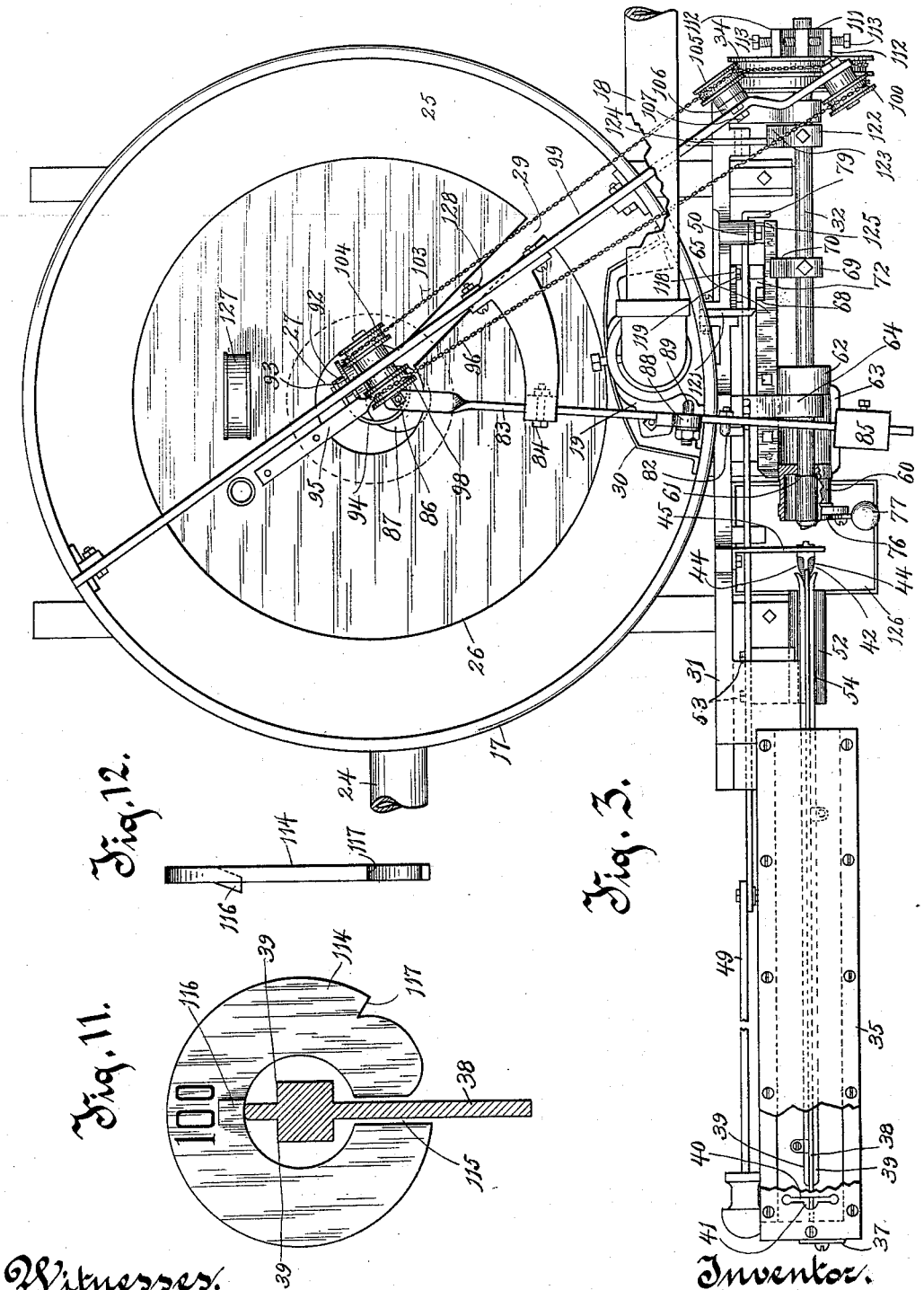
Figure 4:
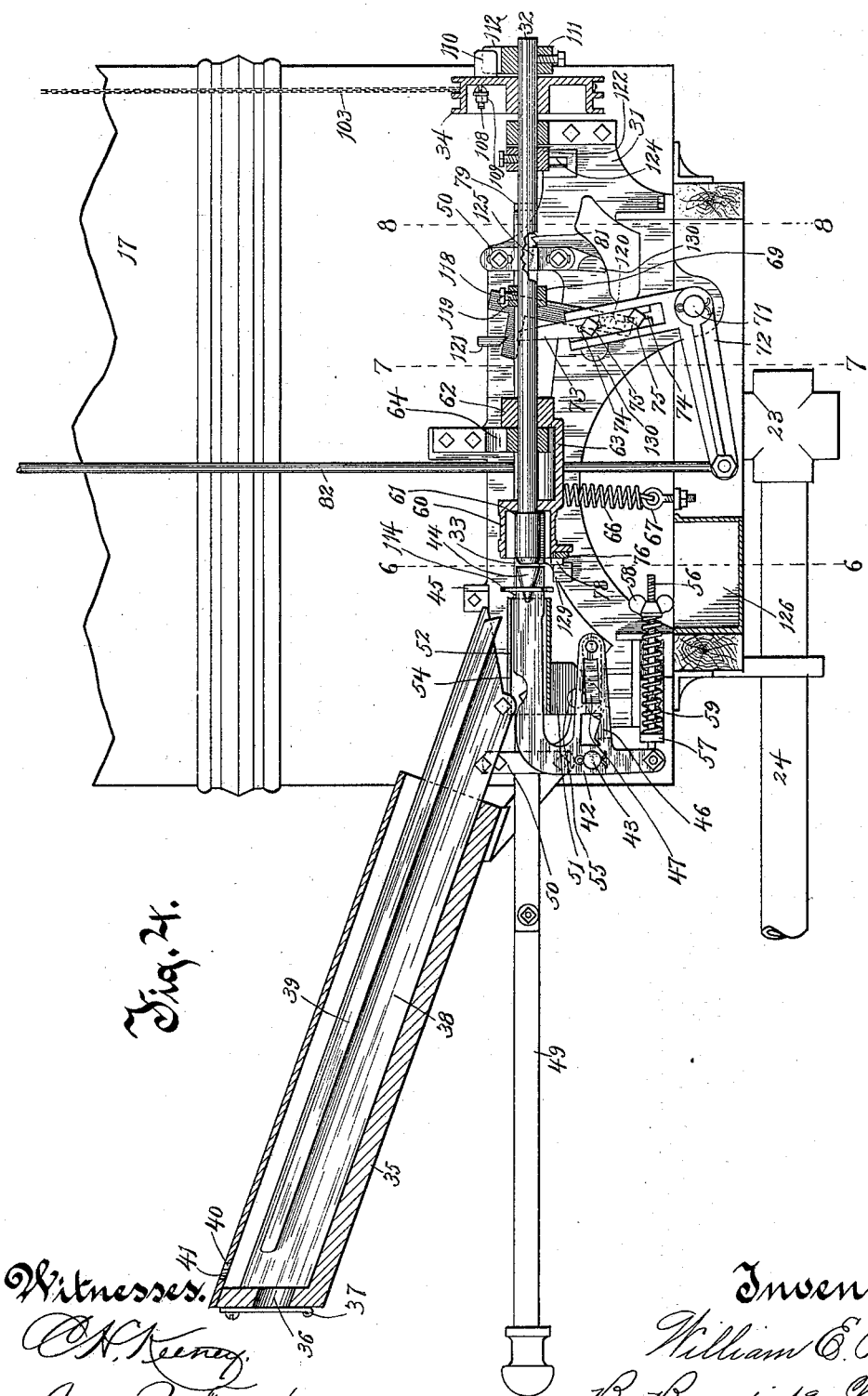
Figure 5:
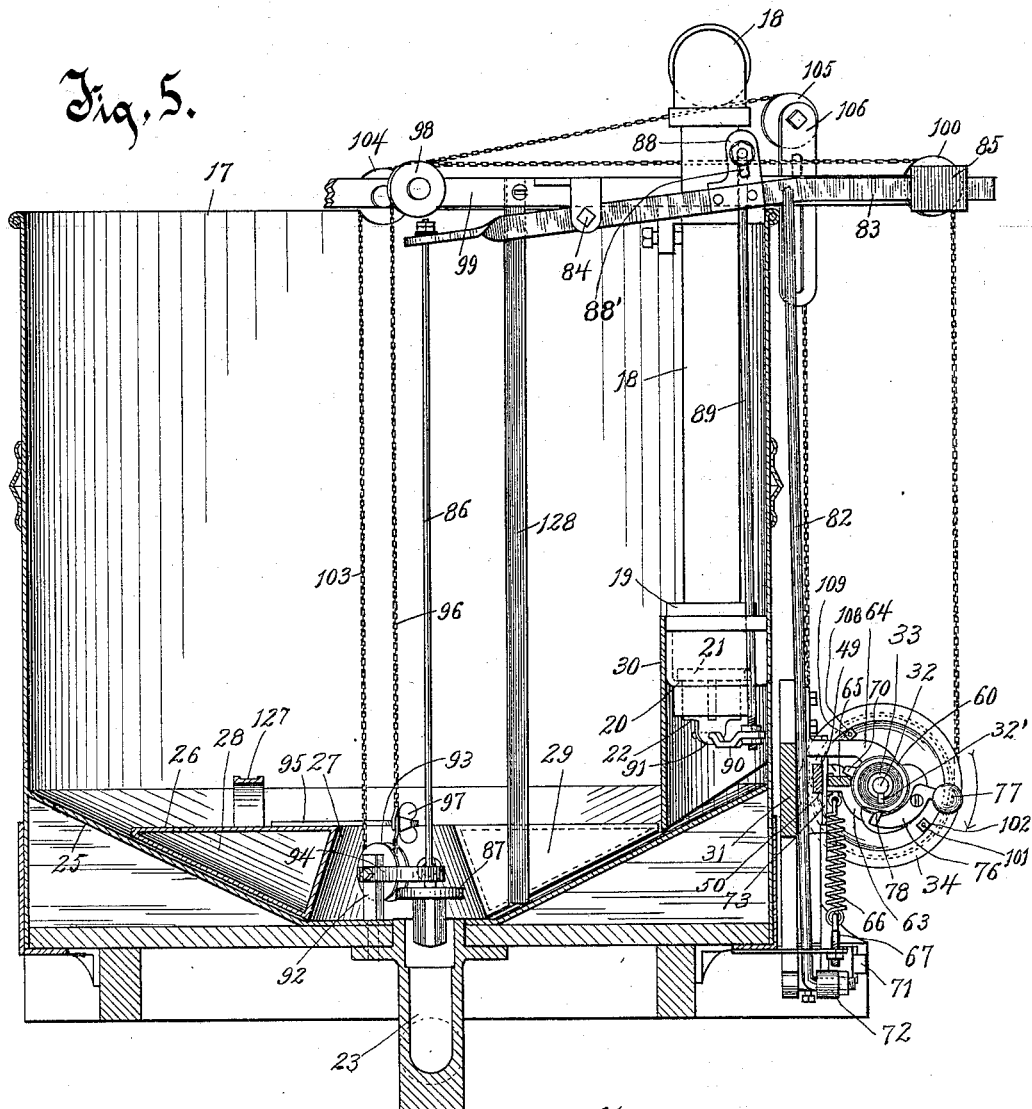
Figure 15:
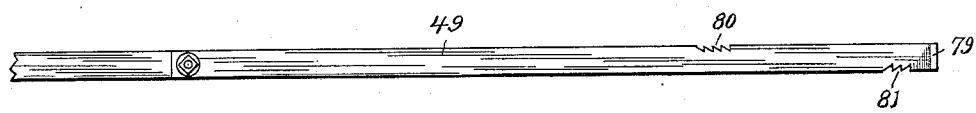

In the accompanying drawings, Figure 1 is a side elevation of the machine, the side of the building and the runway-casing extending therethrough being in section. Fig. 2 is a view of the opposite side of the apparatus to that shown in Fig. 1. Fig. 3 is a plan view, on an enlarged scale, of the complete machine, with parts broken away. Fig. 4 is a similar view to Fig. 1, on an enlarged scale, showing the upper portion of the cylindrical casing broken away and other parts sectioned and broken away and showing a check in position ready to be pushed onto the operating-shaft. Fig. 5 is a central vertical sectional view. Fig. 6 is a section taken on the line 6 6 of Fig. 4. Fig. 7 is a section on the line 7 7 of Fig. 4. Fig. 8 is a section on the line 8 8 of Fig. 4. Fig. 9 is a full-size end view of the operating-shaft and allied parts, showing a check in position thereon to be acted upon by the gravity-pawl. Fig. 10 is a central longitudinal section through Fig. 9. Fig. 11 is a transverse section through the runway, showing a check in position thereon. Fig. 12 is an edge view of one of the checks. Fig. 13 is a detail of the bell-crank lever located at the inner end of the runway. Fig. 14 is a view of the outer end of the runway casing or boxing, and Fig. 15 is a detail of a fragment of the pusher-rod.

Referring to the drawings, the numeral 16 indicates a wall of a building in which the apparatus is located. The numeral 17 indicates the casing of the apparatus, which is preferably of cylindrical form. Leading to and preferably extending through the top of this casing is an inlet-pipe 18, which leads from a skimmed-milk tank. (Not shown.) The lower end of the inlet-pipe is connected to a coupling 19, which forms an interior valve-chamber provided with a valve-seat 20 for a valve 21. This valve is provided on its under side with a series of wings 22, which act as guides for the valve in its vertical movement to effect a proper seating of said valve.

Extending from the bottom of the casing is an outlet-pipe 23, to which is coupled an extension 24, leading to any convenient point, preferably to the outside of the building, so as to be readily accessible to a person desiring to secure his proportion of skimmed milk. This extension 24 is provided with a suitable faucet 24' for regulating the discharge.

Above the bottom proper of the casing is a floor or partition 25, advisably of truncated conical form, the truncated apex thereof resting on and secured to the bottom piece. Normally supported by this floor or partition 25 is a float 26, having its under side of corresponding shape to the partition and provided with a central opening 27, which is surrounded by an annular hollow chamber 28. This chamber is intersected at one point by a passage, as indicated at 29, for a purpose hereinafter specified. The coupling 19 is surrounded by a wall 30. The lower end of this wall is immediately above the bottom or partition 25, and its edge is beveled to correspond to the bevel of the floor or partition. This wall is for the purpose of spreading the skimmed milk which passes through the valve-opening when the inlet-valve is raised from its seat as evenly as possible over the surface of the floor or partition 25.

A framework 31 is arranged adjacent to one side of the casing and is adapted for supporting certain parts of the operating mechanism. Journaled in this framework is an operating-shaft 32, which at one end is beveled, as indicated at 33, and has mounted fast thereon, near its other end, a winch 34.

Extending at an incline, preferably from the exterior of the building and through its wall into the room or apartment where the apparatus is located, is a casing or boxing 35. The outer end of this casing is provided with a sight-opening 36, which is covered or uncovered by means of a pivoted lid 37. The inner end of the casing is open, as clearly shown in Fig. 4 of the drawings. Arranged centrally within the casing and extending longitudinally thereof and through the inner open end of said casing is a runway consisting of a flat bar 38. The upper edge of this runway is free from contact with the top of the casing, so that a slight space is left therebetween. The lower end of the runway extends for a desired distance through and beyond the lower end of its casing. Near its upper edge, on opposite sides, the runway is provided with longitudinal shoulders 39 39. These shoulders, it will be noticed, terminate somewhat short of the upper or outer end of the runway. The top of the box or casing for the runway is provided near its outer end with a slot 40 for the passage therethrough of one of the improved forms of checks hereinafter referred to. The center of this slot is enlarged somewhat, as indicated at 41.

Below the lower end of the runway is a bell-crank lever 42, pivoted at 43 and normally in the position illustrated in Fig. 1—that is to say, with its upper member or arm tilted to an inclined position parallel with the inclined edge of the runway. The extremity of this upper arm of the bell-crank lever is provided upon opposite sides with conical ears or lugs 44 44, which form a continuation of the shoulders 39 of the runway and permit the check to straddle said upper arm of the bell-crank. An arm 45 extends outwardly from the framework and effects the function hereinafter referred to. The lower arm of this bell-crank lever is provided with a projecting branch arm 46, which has pivoted to its inner side a dog 47. The free end of this dog normally rests on a lug 48, formed on the arm.

The numeral 49 indicates a pusher-rod, which is adapted to be moved in suitable guides 50 50. This rod has secured medially thereto a bracket 51, and to the edge of this bracket is secured a cylinder 52. The bracket, pusher-rod, and cylinder are united together by a single bolt 53, as shown clearly in Fig. 6.

The cylinder is provided in its top throughout its length with a slot 54. The bracket has extending therefrom a pin 55. It is obvious that when the pusher-rod is pulled out the bracket and cylinder will be carried therewith. When the bracket has thus been moved a certain distance, its projecting pin 55 will engage under the lower edge of the dog 47 and raise the free end of the dog above the lug 48, and with the continued movement of the bracket the pin thereof will be carried to a point beyond the free end of the dog. When, therefore, the pusher-rod is subsequently pushed inwardly, the pin 55 will be caused to bear on the upper edge of the dog 47, and this pressure will cause the bell-crank lever 42 to turn on its pivot and bring the tilted upper member of said bell-crank lever to a substantially horizontal position and cause the same to pass through the longitudinal slot of the cylinder into line with the operating-shaft, in which position it will be maintained so long as the pin 55 bears on the upper edge of the dog 47. The upper member of the bell-crank lever is sufficiently long so that its end will project beyond the inner end of the cylinder. Pivoted to the lower extremity of the lower arm of the bell-crank lever is a rod 56, which passes through a bracket 57 and carries on its outer threaded extremity a wing-nut 58. A coiled spring 59 encircles the rod between this wing-nut and the bracket 57. The function of this rod and the spring surrounding the same is to normally hold the bell-crank lever in the position shown in Fig. 1 of the drawings. Mounted on the operating-shaft 32 so as to be longitudinally movable thereon is a sleeve 60. The sleeve surrounds an enlarged end of the shaft, excepting the beveled extremity 33, which is left projecting slightly beyond the open end of the sleeve, and the diameter of this sleeve is sufficiently greater than that of the enlarged portion of the shaft as to leave a space between the two. The inner end of the sleeve normally bears against the shoulder 61, formed by the enlarged end of the shaft, said shoulder thereby limiting the outward movement of the sleeve. (See Fig. 4.)

The sleeve just described forms an integral part of a casting, the other portions of said casting consisting of a collar 62, through which the operating-shaft passes, and a yoke 63, which connects the collar with the sleeve 60. This collar 62 normally bears against one side of a central bearing 64 for the operating-shaft. The yoke portion 63 of the casting extends inwardly slightly, and to this inwardly-extending portion is bolted an arm 65.

Connected to the under side of the yoke 63 is the upper end of a coiled spring 66, the lower end of said spring being secured to a screw-eye 67. It will be noticed that the arm 65 is provided on its inner edge with a shoulder 68. Also adjustably secured to the operating-shaft 32 is a collar 69, provided with a projecting lug 70, which in case the spring 66 fails to retrieve the sleeve 60 and its integral parts, said lug will effect that function, as will hereinafter more fully appear. Pivoted on a pivot-pin 71 is a bell-crank lever 72. The upper arm of this lever is adjustable by means of an adjustable section 73, which works in a groove of the fixed arm of the lever and is provided with elongated slots 74 74, through which screws 75 75 pass. By this means the upper arm of the bell-crank lever can be lengthened or shortened to suit the requirements. The upper extremity of this adjustable section of the bell-crank lever extends upwardly back of the operating-shaft 32 in position to be engaged by the shoulder 68 of the arm 65.

The numeral 76 indicates a gravity dog or pawl which is pivoted to the end of the sleeve 60. The outer end of this dog or pawl is weighted, as indicated at 77, so that its inner end is normally swung upwardly, and said inner end is provided with an upwardly-extending lug 78, having an upper rounded edge.

It will be noticed that the inner end of the push-rod 49 extends slightly beyond the end of the arm 65 and is bent forwardly in front of said end of arm 65, as indicated at 79. The push-rod is also provided in its upper edge, near the inner end thereof, with a series of teeth 80, and on its lower edge, at a point nearer its inner end, with a series of similar teeth 81.

Pivotally connected to the lower arm of the bell-crank lever 72 is a vertical rod 82. The upper end of this rod connects to a lever 83, which is pivoted at 84. The outer end of the long arm of this lever has an adjustable weight 85 mounted thereon. This lever extends over the top of the cylindrical casing 17, and its inner end is over approximately a central upper point of said casing. This inner end of the short arm of the lever is provided with an eye or opening through which a valve-rod 86 is adapted to pass freely. The lower end of this valve-rod connects to the outlet-valve 87, which is normally seated on the upper end of the outlet-pipe 23, so as to close said pipe against the escape of the fluid. The lever 83 has extending upwardly therefrom a slotted bracket 88, to which is adjustably connected the valve-rod 89 for the inlet-valve. The lower end of this valve-rod has connected thereto and extending therefrom a short arm 90, which arm connects to a lug 91, extending downwardly from the wings 22 of the inlet-valve. A short upright or standard 92 extends upwardly from the floor or partition 25 and into the central opening 27 of the float when said float is in its lowermost position, and this standard has projecting therefrom a short shaft or axis for a groove-pulley 93. Also connected to this standard and extending therefrom is a bent strap 94, which is adapted to limit the up movement of the outlet-valve 87. Connected to the top of the float 26 and projecting inwardly over the center of the central opening of said float is an arm 95. Connected to this arm is the lower link of a chain 96. The chain is prevented from working off the end of the arm by means of a wing-nut 97, engaging the threaded extremity of this arm. This chain extends upwardly over a pulley 98, mounted medially on an upper beam 99, thence outwardly over another pulley 100, mounted on the outer extremity of said beam, thence downwardly to engage one of the grooves of the winch 34, to which it is secured fast. The means for securing the end of the chain consists, preferably, of passing the inner link of the chain through an opening in the groove to the inner side of the periphery of the winch and then passing a screw, such as 101, through the end link. A nut 102 is then turned onto the screw and tightly clamps the link against the head of the screw. When the chain is taut, the screw of course is brought up against the opening, and it is impossible to draw the end of the chain through the opening of the winch. The arm 95 has also connected thereto the link at one end of a chain 103. This chain extends down and around the pulley 93, and thence upwardly over a pulley 104, also mounted on the beam 99, to and over another pulley 105, which is mounted at the upper end of a slotted bracket 106, adjustably secured to the beam 99 by means of a set-screw 107. This chain is then extended down to the winch 34, and its end is connected to said winch in the same manner as the other chain 96 is connected thereto—viz., it is passed through an opening in the inwardly-extending peripheral rim of the winch, and a screw 108 is passed through the link of the chain, and said link is held against the head of the screw by means of a nut 109.

While I have herein shown and described two separate chains 96 and 103, it is obvious that merely a single chain could be just as conveniently employed and one link of said chain allowed to be engaged by the arm 95. The function of this arm is to move the chain upward or downward with the float, which imparts a rotative motion to the winch 34 and the shaft 32, the chain keeping the float in a central position in the casing.

In order to properly adjust the winch to the operating-shaft 32, I provide the outer face of said winch with a projecting lug 110, and on the outer end of the operating-shaft I fixedly mount a collar 111. This collar is provided with two upwardly-extending lugs 112 112, which straddle the lug 110. Screws 113 113 pass through threaded openings in the lugs 112, and their inner ends bear against the lug 110. It will be readily seen that by adjusting these screws the winch on the shaft can be nicely and accurately adjusted.

The checks used by me in connection with my apparatus consist of a split ring 114, the split portion being indicated by the numeral 115. One face of this ring is provided just above the circular opening thereof and in line with a line intersecting the center of the opening vertically with an outstanding lug 116. The periphery of the ring is also provided with an abrupt shoulder 117. When a customer of the creamery leaves a certain amount of fresh milk, a check of this character is given to him, and the check so given has on its face a certain number indicating the number of pounds he is entitled to receive in skimmed milk. In the check shown in Fig. 11 of the drawings the number "100" is indicated thereon. In checks for a less amount than one hundred the shoulder 117 would be nearer the split 115 of the check—as, for instance, in the case of a check for fifty pounds the shoulder 17 would be located from the edge of the split portion 115—just one-half the distance the shoulder shown in Fig. 11 is located, so that with the decrease of the pound designations on the face of the check the shoulder 117 is brought nearer and nearer to the split 115, until finally said shoulder is formed in the edge of said split. A check in which the shoulder is located as last referred to has, for instance, the designation "30 pounds" indicated thereon. Of course for checks of a greater amount than one hundred pounds the shoulder 117 is located still farther from the split portion 115 than the location shown in Fig. 11 of the drawings.

In the operation of my machine if a person is entitled to one hundred pounds of skimmed milk and has a proper check for that amount he deposits said check into the runway casing or boxing through the slot 40 thereof. It will be noticed, however, that the check can be inserted through said slot only in one position, owing to the lug 116 of the check, and this position has to be such that the said lug 116 registers with the central enlargement 41 of the slot. The moment the check passes through the slot it straddles the runway, and as said runway is disposed at an inclined position the check slides down the same, and after said check has reached the shoulders 39 of the runway it is impossible for said check to tilt upwardly to a horizontal position out of engagement with the runway. When the check reaches the lower end of said runway, it passes onto the upper arm of the bell-crank lever 42 and is prevented from passing off the same by reason of the arm 45. It will be understood that the upper arm of the bell-crank lever is now in the tilted position shown in Fig. 1. It will be noticed that the projecting ends of the shoulders 39 are diverged somewhat, (see particularly Fig. 3,) so as to admit the edge of the upper arm of the bell-crank lever therebetween. When the check thus passes onto the extremity of the upper arm of the bell-crank lever, it straddles the ears or lugs 44 of said lever. If the customer desires to see whether the check has passed downwardly to its proper position, he simply turns the pivoted lid 37 and peers through the sight-opening 36. The next operation is to pull outwardly on the pusher-rod. This has the effect of causing the pin 55 to pass between the lower edge of the dog 47 and the lug 48 and be in position to act on the upper edge of said dog on the instroke of the pusher-rod, as hereinbefore explained. The pusher-rod is therefore then pushed inwardly and the bell-crank lever 42 caused to turn on its pivot, so as to compel its upper arm to pass through the slot 54 of the cylinder 52, said arm of the lever being thereby brought to a horizontal position in line with the operating-shaft 32. Fig. 4 shows this position of the parts, wherein the check is seen as engaging the extremity of the horizontal arm of the bell-crank, which extends beyond the cylinder. Now with the continued in movement of the pusher-rod the check is brought directly against the end of the sleeve 60; but as the circumference of the check is greater than the circumference of the bore of the sleeve said check cannot enter the sleeve and is consequently held against the end thereof. Now with the still further inward movement of the pusher-rod the shoulder 68 of the arm 65 bears against the upper member of the bell-crank lever 72 and turns said bell-crank lever in a direction to cause its lower member to move upwardly. This necessarily imparts an upward movement to the vertical rod 82, and as this rod thus moves upwardly it will cause a turning of the lever 83 on its pivot in a direction to swing the long arm of said lever upwardly and the short arm thereof downwardly. As the valve-rod 86 of the outlet passes loosely through an eye in the end of the short arm of the lever and is suspended therefrom while lever 83 is in its normal position the valve 87 is thereby held open. When the lever 83, however, has completed half its travel downward, as just explained, valve 87 will close and bottom of slot 88' in plate 88 will engage with rod 89 and open inlet-valve 20 to admit of the inflow of the fluid through the inlet-pipe, and thence to the floor or partition 25, and spreads out beneath the float. The moment the fluid or skimmed milk thus gets beneath the float said float begins to rise. As it thus rises a pull is exerted on the strand or chain 103, and the winch 34, and consequently the operating-shaft 32, to which said winch is connected, is caused to rotate in the direction of the arrow, Fig. 5. As the shaft is thus rotated the check which has already been pushed onto the enlargement at the end of the shaft 32 will be caused to rotate with the shaft. The check is carried around with the shaft by the split in the check straddling the feather-key 32' on the shaft, as shown in Fig. 9, and after it has been rotated a certain distance the shoulder 117 of the check will be brought into engagement with the gravity dog or pawl 76 of the sleeve 60, and said sleeve and its integral collar 62 and connecting-yoke 63, together with the arm 65, bolted to the yoke, will be caused to rotate a certain distance on the operating-shaft 32 against the tension of the coiled spring 66. As the yoke is thus rotated the shoulder 68 of the arm 65 is necessarily thrown out of engagement with the upper arm of the bell-crank lever 72, and said bell-crank lever then necessarily returns to its normal position, and in so doing the weight on the end of the lever 83 causes a turning of said lever in a direction to pull upwardly on the valve-rod 86 to open the outlet-valve 87, and the same movement of the lever 83 closes the inlet-valve by operating on the inlet-valve rod 89. The turning of the lever 83 also by reason of said lever operating on the rod 82 causes the return of said bell-crank lever 72 to its normal position. This necessarily shuts off further inflow of the skimmed milk to the floor or partition 25 and causes the milk which is contained within the receptacle 17 and is supported by said floor or partition to pass out through the outlet-pipe to be received in cans or receptacles placed beneath the discharge end of the outlet-pipe by the customer or patron entitled to a certain proportion of skimmed milk, and which discharge end of the outlet-pipe, as previously stated, is preferably extended to the outside of the building. As the skimmed milk thus discharges the float necessarily lowers, and as this float thus lowers the strand of chain 96 is pulled taut, and consequently the winch 34 and the operating-shaft 32, on which said winch is mounted, are caused to turn in a direction opposite to that first explained. When this occurs, the check on the enlarged end of the shaft 32 is also caused to rotate with said shaft, and as the check is thus rotated in this reverse direction the shoulder 117 of the check leaves the lug 78 of the pawl 76. The spring 66, however, has the effect of retrieving the sleeve 60, its integral collar and yoke, as well as the arm 65, carried by the yoke. If the spring should fail to work properly, then the lug 70 will act positively on the arm 65 and cause the return of the parts referred to to their normal position, the limit of the turning of these parts in this direction being regulated by means of an adjustable stop 125, attached to the frame. At this time the upper end of the bell-crank lever 72 is beneath the arm 65, and the arm 65, and consequently the sleeve 60 and its integral parts, are prevented from returning to their final normal rotative position by means of the engagement of the upper end of this bell-crank lever 72 with the under side of the arm 65. It will be understood that these operations take place just as soon as the amount of skimmed milk to which any particular customer is entitled commenced to discharge through the outlet and which amount was indicated on the check deposited by him in the machine.

As it is necessary that the pusher-rod should be securely held in place after it has been pushed in against being pulled outwardly, except when a check is deposited in the machine, I provide a suitable locking means for accomplishing this. Another bell-crank lever 118 is employed, which lever is pivoted at the point 119, and the lower end of its long arm is connected to the upper arm of the bell-crank lever 72 by means of a pivot-pin 120, extending from the upper end of the bell-crank lever 72 and passing through an elongated slot in the long arm of the lever 118. A dog 121 is pivoted to the framework, and the under edge of this dog normally rests on the upper edge of the short arm of the bell-crank lever 118. Now when the pressure-rod is pushed in to its full extent, so that the shoulder 68 of the arm 65 turns the bell-crank lever 72 on its pivot, the bell-crank lever 118 is turned in a direction to cause its short arm to be removed from engagement with the dog 121, and consequently said dog is free to turn downwardly, so as to permit its under edge to engage the teeth 80 on the upper edge of the pusher-rod. This occurs at the time the pusher-rod has been pushed inwardly to its full extent. Now of course when the operating-shaft has been turned in the reverse direction by the descent of the float occasioned by the discharge of the skimmed milk and the bell-crank lever 72 is brought back to its normal position and the bell-crank lever 118 is thereby also returned to its normal position, the pivoted dog 121 is again raised by said bell-crank 118, it becomes necessary to lock the pusher-rod by supplemental means. This consists in mounting upon the operating-shaft 32 a set-collar 122, said set-collar provided with a projecting tappet 123. Another dog 124 is pivoted to the framework, which dog is normally in engagement with the tappet of the collar 122. Fig. 8 will illustrate the operation of this supplemental locking means. It will be understood that when the shaft is rotated in the direction of the arrow shown in said Fig. 8 the tappet is turned out of engagement with the end of the dog 124, and said dog will then turn on its pivot and engage the teeth 81 on the lower edge of the pusher-rod. Both the pivoted dogs 120 and 124 will now be in engagement with the pusher-rod. It will therefore be understood that during the time the skimmed milk is flowing into the receptacle 17 both the dogs 121 and 124 are in engagement with the pusher-rod. Now after the inflowing of the skimmed milk has ceased and the outflow commences then the pivoted dog 121 is released from engagement with the pusher-rod while the dog 124 is still in engagement therewith and will remain in such engagement until the shaft 32 has turned sufficiently far in the reverse direction to cause the tappet 123 to act against the dog 124 to release said dog from the under teeth of the pusher-rod, which occurs when all the skimmed milk in the tank has been discharged. From this description it will be seen that the pivoted dog 121 serves to lock the pusher-rod against being drawn out during the inflow of the skimmed milk into the casing 17, while the dog 124 not only locks said pusher-rod against being pulled out during the inflow of the skimmed milk into the casing 17, but also during the discharge of the skimmed milk from the casing 17.

It will be understood that during the operation just described—viz., the pushing in of the pusher-rod—the pin 55 of the bracket 51 is necessarily carried beyond the inner end of the dog 47, and the moment this pin leaves the end of said dog the bell-crank lever 42 returns to its normal position (shown in Fig. 1) ready for a new operation.

After the completion of the operation just described the sleeve 60 and its integral parts are left in the position shown most clearly in Fig. 10 if the customer did not pull the pusher-rod outwardly. The next customer, therefore, will deposit his check in the boxing or casing for the runway and the check will slide downwardly to the end of said runway and be held in the manner hereinbefore fully pointed out. He next pulls the pusher-rod outwardly, and this has the effect of returning the sleeve 60 and its integral parts to their normal longitudinal position on the operating-shaft 32 by reason of the engagement of the bent end 79 of said pusher-rod with the end of the arm 65. As the sleeve 60 is thus pulled outwardly it will act against the check which is already on the enlarged end of the shaft 32 and cause said check to be pushed off the beveled end of the shaft and to drop into the receptacle 126. The operation first explained is now repeated.

I have shown in the drawings the float as provided with a handle 127 for convenience in lifting said float when the same is desired to be removed from the casing 17. I also provide a downwardly-extending arm 128, secured at its upper end to the beam 99 and having its lower end extending into the intersecting passage 29 of the float 26. The function of this arm is to prevent the float from swinging around, and thereby twisting the chains.

The framework is provided with a stop 129, against which the bracket 51 is adapted to contact in order to limit the inward movement of said bracket and the cylinder attached thereto. There are also stops 130 130 on opposite sides of the upper arm of the bell-crank lever 72 to limit the swing of said bell-crank lever.

After a customer has filled one can he can turn the faucet 24' of the discharge-pipe, and thereby shut off further flow of milk until another can is placed in position. When this faucet is thus turned to shut off the outflow of milk, it will be understood that the operative parts of the machine at once cease to work, and consequently the further discharge can be resumed by turning on the faucet again, and this is accomplished without in the least interfering with the proper measuring of the milk.

In this class of machines it is not usually customary to return to a customer the same number of pounds of skimmed milk which he left in fresh milk, but only a certain percentage thereof. This percentage of skimmed milk to be returned is regulated by the winch 34—that is to say, by the diameter of said winch. If the same proportion of skimmed milk were returned to the customer which he left of fresh milk, the winch would be seven and one-eighth inches in diameter. If the system of the creamery, however, required that only eighty per cent. be returned in skimmed milk, then a winch would be employed five and three-fourths inches in diameter. It will be readily seen that by substituting winches of different diameters the percentage of skimmed milk returned can be readily regulated.

One of the important features of my invention is the fact that it cannot possibly be operated unless a person drops into the casing or boxing for the runway a proper form of check. Unless a check is in engagement with the inner end of the bell-crank lever 42 an inpush on the pusher-rod will simply cause the cylinder 52 to pass into the sleeve 60 without moving said sleeve longitudinally on the shaft, the inward movement of the cylinder being completed by contact of its bracket with the stop 129 before the inner end of said cylinder can contact with the inner wall of the sleeve 60.

What I claim as my invention is—

1. As a new article of manufacture, a check for a liquid-measuring machine, consisting of a split ring having a peripheral shoulder.

2. As a new article of manufacture, a check for liquid-measuring machines, consisting of a split ring, having on one face a projecting lug, said lug being on the plane of a line drawn vertically and centrally through the opening of the ring.

3. As a new article of manufacture, a check for a liquid-measuring machine, consisting of a split ring having a peripheral shoulder, and said ring also having on one face a projecting lug.

4. In a liquid-measuring machine, the combination, with a box or casing provided with a slot having an enlargement at one point, and a runway arranged longitudinally therein, and consisting of a beam having its upper edge free from contact with the top of the box or casing, and provided on opposite sides with longitudinal shoulders, said shoulders terminating short of the upper end of the runway.

5. In a liquid measuring and discharging machine, the combination, of a casing having valve-controlled inlet and discharge openings, valve-operating mechanism adapted to operate in conjunction with a mechanism-controlling check, for seating and unseating the valves, whereby, when the inlet is opened and the outlet closed, a certain measured quantity of the liquid corresponding to an index on the check is permitted to enter the casing, and, when the inlet is closed and the outlet opened, the measured quantity of liquid is automatically discharged, and a pusher-rod adapted, when pushed inwardly, to act on the mechanism-controlling check so as to force said check into position to operate on the valve-controlling mechanism to open the inlet and close the outlet, said check, during the time the pusher-rod is held inwardly, and after a predetermined quantity of fluid has entered the casing through the inlet, adapted to be acted on by the valve-operating mechanism, so as to cause the closing of the inlet and the opening of the outlet.

6. In a liquid measuring and discharging machine, the combination, of a casing having valve-controlled inlet and discharge openings, a float within the casing adapted, when the inlet is opened and the outlet closed, to be raised as the liquid passes into the casing, and, when the inlet is closed and the outlet opened, to be lowered as the liquid discharges from the casing, a shaft, valve-operating mechanism, mechanism carried by the shaft for operating on the valve-operating mechanism, mechanism between the float and the shaft for rotating said shaft in opposite directions, and means for operating the mechanism carried by the shaft, whereby when said mechanism is operated in one direction the inlet-valve is opened and the float caused to ascend by the inflowing liquid, said ascent causing the rocking of the shaft in one direction, whereby the mechanism carried by said shaft and which is adapted to act on the valve-operating mechanism will, after a certain quantity of liquid has entered the casing, act on said valve-operating mechanism so as to cause a closing of the inlet and an opening of the outlet for the discharge of the contents of the casing and the descent of the float, which descent of the float will cause the rocking of the shaft in the opposite direction, and the mechanism carried by said shaft to be returned to a position to again act on the valve-operating mechanism.

7. In a liquid measuring and discharging machine, the combination, of a casing having valve-controlled inlet and outlet openings, valve-operating mechanism, a sliding and rotative part, means for sliding the sliding and rotative part, whereby, when slid longitudinally in one direction, it will actuate the valve mechanism to cause an unseating of the inlet-valve, and means for giving a partial rotation to said sliding and rotative part, to cause, after a certain quantity of liquid has been admitted to the casing, a seating of the inlet-valve and an unseating of the outlet-valve, and means for returning the sliding and rotative part to its normal rotative and longitudinal positions.

8. In a liquid measuring and discharging machine, the combination, of a casing having valve-controlled inlet and outlet openings, valve-operating mechanism, a sliding and rotative part adapted to be engaged by a mechanism-controlling check, said check adapted to act on the sliding and rotative part, to cause the sliding of said part in one direction, whereby it is caused to actuate the valve mechanism in a manner to unseat the inlet-valve, and said mechanism-controlling check adapted, at this time, to give a partial rotation to said sliding and rotative part, to cause, after a certain amount of liquid has been admitted to the casing, the seating of the inlet-valve and the unseating of the outlet-valve, and means adapted for returning the sliding and rotative part to its normal rotative and longitudinal positions.

9. In a liquid measuring and discharging machine, the combination, of a casing having valve-controlled inlet and outlet openings, valve-operating mechanism, a sliding and rotative part adapted to be engaged by a mechanism-controlling check, said check adapted to act on the sliding and rotative part to cause the sliding of said part in one direction, whereby it is caused to actuate the valve mechanism, which mechanism under such actuation unseats the inlet-valve, and said mechanism-controlling check adapted, at this time, to give a partial rotation to said sliding and rotative part, to cause, after a certain amount of liquid has been admitted to the casing, the seating of the inlet-valve and the unseating of the outlet-valve, and means adapted for returning the sliding and rotative part to its normal rotative and longitudinal positions, and for ejecting the mechanism-controlling check simultaneously with the return of the sliding and rotative part to its normal longitudinal position.

10. In a liquid measuring and discharging machine, the combination, of a casing having valve-controlled inlet and outlet openings, valve-operating mechanism, a float within the casing, an operating-shaft, mechanism between the shaft and the float, a sliding and rotative part on the shaft, mechanism adapted to act on the sliding and rotative part to cause the sliding of said part in one direction, whereby it will actuate the valve mechanism and cause an unseating of the inlet-valve to admit the liquid into the casing and cause the ascent of the float, said ascent of the float, through the mechanism between the float and the shaft, causing a partial rotation of said shaft and a consequent partial rotation of the sliding and rotative part, which partial rotation of the sliding and rotative part will, after a certain quantity of the liquid has been admitted to the casing, cause a seating of the inlet-valve and an unseating of the outlet-valve, for the outflow of the liquid and the consequent descent of the float, said descent of the float causing the shaft to be rotated in the opposite direction, and the sliding and rotative part to be rotated therewith and thereby returned to its normal rotative position, and means for causing the sliding and rotative part to be returned to its normal longitudinal position.

11. In a liquid measuring and discharging machine, the combination, of a casing having valve-controlled inlet and discharge openings, valve-operating mechanism, a float within the casing, an operating-shaft having a winch mounted thereon, a chain fast at one point to the float, and thence passing around a pulley mounted in the bottom of the casing, and thence upwardly over other pulleys, and finally fastened at its ends to the winch, a slidable and rotative part on the shaft, mechanism adapted to act on the slidable and rotative part to cause the sliding of said part in one direction to actuate the valve mechanism and cause the unseating of the inlet-valve to admit the liquid into the casing and also cause the ascent of the float, said ascent of the float, through the chain connection, causing a partial rotation of the shaft and a consequent partial rotation of the slidable and rotative part, which partial rotation of said part will, after a certain quantity of the liquid has been admitted to the casing, cause a seating of the inlet-valve and an unseating of the outlet-valve for the discharge of the liquid and the consequent descent of the float, said descent of the float through another chain connection causing the rotation of the shaft in the opposite direction, and the slidable and rotative part to be rotated therewith, and thereby returned to its normal rotative position, and means for causing the sliding and rotative part to be returned to its normal longitudinal position.

12. In a liquid measuring and discharging machine, the combination, of a casing having an inlet and a discharge opening, a pivoted lever, a valve-rod suspended freely through an eye in the short arm of the lever, and carrying at its lower end a valve adapted to close and open the outlet-opening, another valve-rod pivoted medially to the long arm of the lever, and carrying at its lower end a valve adapted to close and open the inlet-opening, and an operating-rod connected to the lever and adapted to turn the same in opposite directions on its pivot.

13. In a liquid measuring and discharging machine, the combination, of a casing having an inlet and a discharge opening, a pivoted lever, a valve-rod suspended freely through an eye in the short arm of the lever, and carrying at its lower end a valve adapted to close and open the outlet-opening, another valve-rod pivoted medially to the long arm of the lever and carrying at its lower end a valve adapted to close and open the inlet-opening, a rod connected to the lever, a bell-crank lever to one arm of which the rod is adapted to be connected, and means for operating on the bell-crank lever to turn the same on its pivot.

14. In a liquid measuring and discharging machine, the combination, of a casing having inlet and discharge openings, valve-operating mechanism, a float within the casing, an operating-shaft, a winch rotative with the shaft, but constructed to be removed therefrom to adapt another winch of varying diameter to be substituted therefor, whereby the percentage of liquid discharged is regulated, a chain fast at one point to the float, and thence passing around a pulley mounted in the bottom of a casing, and thence upwardly over other pulleys, and finally fastened at its ends to the winch, a slidable and rotative part on the shaft, mechanism adapted to act on the slidable and rotative part, to cause the sliding of said part in one direction whereby the valve mechanism is caused to be actuated and the inlet-valve unseated to admit the liquid into the casing and the float also caused to ascend, said ascent of the float, through the chain connection, causing a partial rotation of the shaft and a consequent partial rotation of the slidable and rotative part, which partial rotation of the slidable and rotative part will, after a certain quantity of the liquid has been admitted to the casing, cause a seating of the inlet-valve, and an unseating of the outlet-valve for the discharge of the liquid and a consequent descent of the float, said descent of the float, through another chain connection, causing the rotation of the shaft in the opposite direction, and the slidable and rotative part to be rotated therewith and thereby returned to its normal rotative position, and means for returning the slidable and rotative part to its normal longitudinal position.

15. In a liquid measuring and discharging machine, the combination, of a casing having valve-controlled inlet and discharge openings, valve-operating mechanism, a slidable and rotative part, a pusher-rod adapted to slide said slidable and rotative part both inwardly and outwardly, said rod on its inthrust adapted to slide the slidable and rotative part to cause said part to actuate the valve mechanism and thereby unseat the inlet-valve, means for giving a partial rotation to said slidable and rotative part to cause, after a certain quantity of liquid has been admitted to the casing, a seating of the inlet-valve and an unseating of the outlet-valve, and means for returning the slidable part to its normal rotative position, whereby the slidable and rotative part can be returned to its normal longitudinal position upon the outpulling of the pusher-rod.

16. In a liquid measuring and discharging machine, the combination, of a casing having valve-controlled inlet and discharge openings, valve-operating mechanism, a slidable and rotative part adapted to be engaged by a mechanism-controlling check, said check adapted to bear against the slidable part, and to slide said part inwardly so as to actuate the valve mechanism and thereby unseat the inlet-valve, means for giving a partial rotation to said slidable and rotative part to cause, after a certain quantity of liquid has been admitted to the casing, a seating of the inlet-valve and an unseating of the outlet-valve, and which means are controlled by the check, so that the inflow into the casing ceases as soon as the quantity indicated on the check is admitted to the casing, means acting in a manner to return the slidable and rotative part to its normal rotative position, and means for returning the slidable and rotative part to its normal longitudinal position.

17. In a liquid measuring and discharging machine, the combination, of a casing having valve-controlled inlet and discharge openings, valve-operating mechanism, a slidable and rotative part, adapted to be engaged by a mechanism-controlling check, a pusher-rod adapted to act on its inthrust to force the check into proper position and to cause said check to bear against the slidable part and to slide said part inwardly so as to actuate the valve mechanism and thereby unseat the inlet-valve, means for giving a partial rotation to said slidable and rotative part to cause, after a certain quantity of the liquid has been admitted to the casing, a seating of the inlet-valve and an unseating of the outlet-valve, and which means are controlled by the check, so that the inflow into the casing ceases as soon as the quantity indicated on the check is admitted to the casing, and means acting in a manner to return the slidable and rotative part to its normal rotative position, in position to be returned to its normal longitudinal position by the outpulling of the pusher-rod.

18. In a liquid measuring and discharging machine, the combination, of a casing having valve-controlled inlet and discharge openings, valve-operating mechanism, a bell-crank lever adapted to act on said valve-operating mechanism, a slidable and rotative part provided with a projecting arm, said slidable and rotative part adapted to be engaged by a mechanism-controlling check, a pusher-bar adapted to act on its inthrust to force the check into proper position to cause said check to bear against the slidable part and to slide said part inwardly so as to cause the arm of said sliding part to act on the bell-crank lever, and thereby unseat the inlet-valve, means for giving a partial rotation to said slidable and rotative part, so as to release the arm thereof from engagement with the bell-crank lever, and thereby cause, after a certain quantity of the liquid has been admitted to the casing, a seating of the inlet-valve and an unseating of the outlet-valve, and which means are controlled by the check, so that the inflow into the casing ceases as soon as the quantity indicated on the check is admitted to the casing, and means acting in a manner to return the slidable and rotative part to its normal rotative position, and in position so that the arm thereof may be acted upon by the end of the pusher-rod so as to return the slidable and rotative part to its normal longitudinal position.

19. In a liquid measuring and discharging machine, the combination, of a casing having valve-controlled inlet and discharge openings, valve-operating mechanism, a slidable and rotative part, a dog or pawl pivoted thereto, and adapted to be engaged by a mechanism-controlling check provided with a peripheral shoulder, said check adapted to bear against the slidable and rotative part and slide said part inwardly so as to actuate the valve mechanism and thereby unseat the inlet-valve, means for giving a partial rotation to the mechanism-controlling check, whereby its shoulder is brought into engagement with the dog and the slidable and rotative part, thereby giving a partial rotation, to cause, after a certain quantity of the liquid has been admitted to the casing, said quantity corresponding to the quantity indicated on the check, a seating of the inlet-valve and an unseating of the outlet-valve, means for causing a return of the check to its normal rotative position, and means for retrieving the slidable and rotative part to its normal rotative position and to its normal longitudinal position.

20. In a liquid measuring and discharging machine, the combination, of a casing having valve-controlled inlet and discharge openings, valve-operating mechanism, a pusher-rod, a slidable and rotative part adapted to be engaged by a mechanism-controlling check, said slidable and rotative part formed with a sleeve portion having a bore of less diameter than the diameter of the check, but of sufficient diameter to permit the engaging part of the pusher-rod to enter therein when the check is not against the sleeve portion of the sliding and rotative part, said check, when against the sleeve of the slidable and rotative part, adapted to be acted upon by the pusher-rod, whereby the slidable part is moved inwardly to actuate the valve mechanism and thereby unseat the inlet-valve, means for giving a partial rotation to said slidable and rotative part to cause, after a certain quantity of the liquid has been admitted to the casing, a seating of the inlet-valve and an unseating of the outlet-valve, and which means are controlled by the check, so that the inflow into the casing ceases as soon as the quantity indicated on the check is admitted to the casing, and means acting in a manner to return the slidable and rotative part to its normal rotative position, in position to be returned to its normal longitudinal position by the outpulling of the pusher-rod.

21. In a liquid measuring and discharging device, the combination, of a casing having valve-controlled inlet and discharge openings, valve-operating mechanism, a pivoted bell-crank lever, one arm thereof adapted to carry a mechanism-controlling check-lever, and a pusher-rod adapted, on its inthrust, to act on the bell-crank lever to cause said bell-crank lever to bring the mechanism-controlling check to a position to act on the valve-operating mechanism.

22. In a liquid measuring and discharging machine, the combination, of a casing having valve-controlled inlet and discharge openings, valve-operating mechanism, a pivoted bell-crank lever having one member provided with a projecting arm, said arm formed with a lug and its other member adapted to carry a mechanism-controlling check, a dog pivoted to said arm and having its free end normally resting on the lug, and a pusher-rod provided with a projecting pin, said pin on the outpull of the rod adapted to pass between the dog and the lug, and on the instroke of the rod adapted to act on the upper edge of the dog, whereby the lever is tilted so as to bring the mechanism-controlling check to a position to act on the valve-operating mechanism.

23. In a liquid measuring and discharging machine, the combination, of a casing having valve-controlled inlet and discharge openings, valve-operating mechanism, a pivoted bell-crank lever, means for normally holding said lever in a position to cause its upper arm to be at an incline, said upper arm adapted to carry a mechanism-controlling check, and a pusher-rod provided with a projecting cylinder having a slotted upper portion, said pusher-rod adapted on its inthrust to act on the bell-crank lever to cause said bell-crank lever to be turned so that its upper arm will pass into the cylinder, and the inner end of said arm, projecting through the cylinder and which carries the check, to be in position to cause said check to act on the valve-operating mechanism.

24. In a liquid measuring and discharging machine, the combination, of a casing having valve-controlled inlet and discharge openings, valve-operating mechanism, a runway consisting of an inclined beam having longitudinal shoulders on opposite sides, a pivoted bell-crank lever adapted to be normally turned on its pivot so that its upper arm will be at an incline adjacent to the lower end of the runway, said arm provided upon opposite sides with ears or lugs, and said arm adapted to carry a mechanism-controlling check consisting of a split ring adapted to straddle the runway and to be locked beneath the shoulders thereof, and to pass down to the bell-crank lever and to straddle the tilted arm thereof and to be locked beneath the ears or lugs on opposite sides of said arm of the bell-crank lever, and means for turning the bell-crank lever so as to throw its upper arm to a horizontal position in order to bring the mechanism-controlling check to a position to act on the valve-operating mechanism.

25. In a liquid measuring and discharging machine, the combination, of a casing having valve-controlled inlet and discharge openings, valve-operating mechanism, a pusher-bar adapted on its inthrust to act on the valve-operating mechanism so as to open the inlet and allow a certain quantity of liquid to pass into the casing, other mechanism acting on the valve-operating mechanism to close the inlet-opening and open the outlet-opening, after a certain quantity of liquid has entered the casing, means for locking the pusher-bar during the time the liquid is flowing into and out of the casing, and means for unlocking said bar after the casing has been emptied of its contents.

26. In a liquid measuring and discharging machine, the combination, of a casing having valve-controlled inlet and discharge openings, valve-operating mechanism, a pivoted bell-crank lever adapted to act on said valve-operating mechanism, a pusher-bar provided on one edge with teeth, said bar adapted to cause an operation of the valve-operating mechanism so as to open the inlet and allow a certain quantity of the liquid to pass into the casing, other mechanism acting on the bell-crank lever to close the inlet-opening and open the outlet-opening, after a certain quantity of the liquid has entered the casing, another bell-crank lever connected to the first-mentioned bell-crank lever, and a dog normally engaged by one arm of said other bell-crank lever, and thereby held out of engagement with the teeth of the pusher-bar, said dog adapted to be released by said bell-crank lever, when the other lever is turned, so as to permit the dog to engage the teeth of the pusher-bar, and thereby lock said bar during the time the liquid is flowing into the casing, and said bell-crank lever raising the dog out of engagement with the teeth of the pusher-bar, when the bell-crank lever which actuates the dog is turned in a reverse direction.

27. In a liquid measuring and discharging machine, the combination, of a casing having valve-controlled inlet and discharge openings, valve-operating mechanism, a rocking shaft, provided with a projecting tappet, a pusher-bar provided on one edge with teeth, said bar on its inthrust adapted to act on the valve-operating mechanism so as to open the inlet and allow a certain quantity of the liquid to pass into the casing, other mechanism acting on the valve-operating mechanism to close the inlet-opening and open the outlet-opening, after a certain quantity of the liquid has entered the casing, said operation also causing a rotation of the shaft carrying the projecting tappet, and a pivoted dog normally in engagement with the teeth of the pusher-bar during the time the casing is being filled and emptied of its contents, but adapted to be turned out of engagement with said teeth by the tappet, as said tappet is swung around to a certain position, after the casing is fully emptied of its contents.

28. In a liquid measuring and discharging machine, the combination, of a casing having valve-controlled inlet and discharge openings, valve-operating mechanism, a rocking shaft provided with a projecting tappet, a pusher-bar provided on opposite edges with teeth, said bar adapted on its inthrust to act on the valve-operating mechanism so as to open the inlet and allow a certain quantity of the liquid to pass into the casing, other mechanism acting on the valve-operating mechanism to close the inlet and open the outlet opening, after a certain quantity of liquid has entered the casing, said operation also causing a rotation of the shaft carrying the tappet, a dog adapted to engage the teeth on one edge of the pusher-bar and to lock said bar during the time the liquid is flowing into the casing, means for raising the dog out of engagement with the teeth to unlock the rod, and a pivoted dog normally in engagement with the teeth on the other edge of the pusher-bar, during the time the case is being filled and emptied of its contents, and adapted to be turned out of engagement with said teeth by the tappet, as said tappet is swung around to a certain position, after the casing is fully emptied of its contents.

In testimony whereof I affix my signature in presence of two witnesses.

WILLIAM E. PENN.

Witnesses:
A. W. GREENWOOD,
G. E. GREENWOOD.